(12) United States Patent
Bloomfield

(10) Patent No.: US 11,293,198 B2
(45) Date of Patent: Apr. 5, 2022

(54) FENCE TRIM GUARD WITH LIGHTS

(71) Applicant: Charles Bloomfield, Sevierville, TN (US)

(72) Inventor: Charles Bloomfield, Sevierville, TN (US)

( * ) Notice: Subject to any disclaimer, the term of this patent is extended or adjusted under 35 U.S.C. 154(b) by 140 days.

(21) Appl. No.: 16/879,814

(22) Filed: May 21, 2020

(65) Prior Publication Data

US 2021/0363777 A1   Nov. 25, 2021

(51) Int. Cl.
| | |
|---|---|
| *E04H 17/08* | (2006.01) |
| *F21S 8/00* | (2006.01) |
| *F21V 33/00* | (2006.01) |
| *A01K 3/00* | (2006.01) |
| *E04H 17/06* | (2006.01) |
| *E04H 17/10* | (2006.01) |

(52) U.S. Cl.
CPC ............ *E04H 17/08* (2013.01); *A01K 3/005* (2013.01); *E04H 17/063* (2013.01); *E04H 17/124* (2021.01); *F21S 8/032* (2013.01); *F21V 33/006* (2013.01)

(58) Field of Classification Search
CPC ....... E04H 17/06; E04H 17/063; E04H 17/08; A01K 3/005; A01K 15/006; A01K 15/04; A01G 9/28; A01G 13/0256; F21S 8/032
See application file for complete search history.

(56) References Cited

U.S. PATENT DOCUMENTS

| | | | | |
|---|---|---|---|---|
| 3,384,351 A | * | 5/1968 | Turner, Jr. ............ | E04H 17/063 256/32 |
| 3,495,352 A | * | 2/1970 | Sbare ....................... | A01G 9/28 47/33 |
| 3,515,373 A | * | 6/1970 | Abbe ....................... | A01G 9/28 256/32 |
| 3,768,780 A | * | 10/1973 | Cowles ................. | E04H 17/063 256/1 |
| 3,806,096 A | * | 4/1974 | Eccleston ............. | E04H 17/063 256/32 |
| 3,822,864 A | * | 7/1974 | Keys ..................... | E04H 17/063 256/32 |
| 3,991,980 A | * | 11/1976 | Blackburn ............ | E04H 17/063 256/45 |

(Continued)

FOREIGN PATENT DOCUMENTS

| | | | | |
|---|---|---|---|---|
| CA | 2312299 A1 | * | 9/2001 | ......... A01G 13/0256 |
| CH | 607883 A5 | * | 12/1978 | ............... A01G 9/28 |

(Continued)

*Primary Examiner* — Jonathan P Masinick
(74) *Attorney, Agent, or Firm* — Lawrence J. Gibney, Jr.

(57) ABSTRACT

The device is comprised of two panels in the shape of "L"s that are interwoven with each other when they are placed on the sides of a fence. The device is secured to the ground through a series of holes for that purpose. Additionally, an expander has been placed on the section of the device, both vertical and horizontal, to address the issue of uneven terrain. A row of embedded lights is installed in each of the horizontal panels to provide additional illumination. Alternatively, a series of embedded wires may be installed in the horizontal panels that rest on the ground to provide a small (but not deadly) shock to prevent animals from entering the yard or preventing a family pet from leaving the yard.

7 Claims, 12 Drawing Sheets

(56) References Cited

U.S. PATENT DOCUMENTS

| | | | | |
|---|---|---|---|---|
| 4,349,989 A * | 9/1982 | Snider, Jr. | ............ | E04H 17/063 256/32 |
| 4,497,472 A * | 2/1985 | Johnson | ................ | E04H 17/063 256/1 |
| 4,548,388 A * | 10/1985 | Cobler | ................. | E04H 17/063 256/1 |
| 4,595,175 A * | 6/1986 | Kauffman | ................ | A01G 9/28 256/1 |
| 4,690,382 A * | 9/1987 | Koperdak | ............ | E04H 17/063 256/1 |
| 4,737,764 A * | 4/1988 | Harrison | ................ | E04F 15/02 340/286.13 |
| 4,903,947 A * | 2/1990 | Groves | ................... | A01G 9/28 256/32 |
| 4,964,619 A * | 10/1990 | Glidden, Jr. | .......... | E04H 17/063 256/32 |
| 5,039,065 A * | 8/1991 | Denton | ................ | E04H 17/063 256/1 |
| 5,178,369 A * | 1/1993 | Syx | .......................... | A01G 9/28 256/32 |
| 5,328,156 A * | 7/1994 | Hoke | ..................... | E04H 17/02 256/1 |
| 5,377,447 A * | 1/1995 | Fritch | ..................... | A01G 9/28 47/33 |
| 5,438,804 A * | 8/1995 | Reum | ..................... | A01G 9/28 52/102 |
| 5,660,374 A * | 8/1997 | Dayberry | ............. | E04H 17/063 256/1 |
| 5,769,562 A * | 6/1998 | Jones | .................... | E01C 11/221 404/7 |
| 6,076,448 A * | 6/2000 | Rexroad | ................. | E04H 17/02 256/45 |
| 10,064,348 B1* | 9/2018 | Borras | ................... | A01G 25/00 |
| 10,428,551 B1 | 10/2019 | Bloomfield | | |
| 2003/0160224 A1* | 8/2003 | Damon | ................ | E04H 17/063 256/19 |
| 2008/0184619 A1* | 8/2008 | Heighton | ............. | F21V 33/006 47/33 |
| 2009/0094734 A1* | 4/2009 | Diebel | ...................... | F21S 4/24 4/506 |
| 2009/0165372 A1* | 7/2009 | Smart | ...................... | A01G 9/28 47/33 |
| 2014/0245660 A1* | 9/2014 | Rooney | ............. | A01G 13/0256 47/9 |
| 2018/0148950 A1* | 5/2018 | Hays | .................... | E04H 17/063 |

FOREIGN PATENT DOCUMENTS

| | | | | |
|---|---|---|---|---|
| DE | 29701313 U1 * | 5/1997 | ............... | H05C 1/04 |
| DE | 29921156 U1 * | 4/2000 | ............ | F21S 8/032 |
| DE | 102005024583 A1 * | 11/2006 | ............... | A01G 9/28 |
| DE | 102010036579 A1 * | 1/2012 | ............ | E01C 11/223 |
| FR | 2719973 A1 * | 11/1995 | ............... | A01G 9/28 |

\* cited by examiner

FENCE TRIM GUARD WITH LIGHTS

A. FIELD OF THE INVENTION

This device relates to preventing grass from growing along a fence area to decrease time associate with the yardwork (clipping and trimming) that is typically involved in maintaining a home. The device can also be used to prevent animals from burrowing under fencing and this would be particularly helpful on farms or residential areas. Embedded members will also be included to provide illumination on the horizontal members; alternatively, the embedded members may be a strand or strands of wire to provide a non-lethal shock to animals that want to burrow under the fence and enter the yard or an animal that wants to burrow under the fence to escape from the yard.

B. PRIOR ART

The Rooney US Patent Publication 2014/0245660 teaches a flat weed guard for a fence which is intended to be a barrier between the fence and the surrounding grass. The Rooney device will allow the plurality of perforations to proceed the fence post and a plurality of anchoring segments that are to be placed in the ground.

Another representative example can be found at Kauffman U.S. Pat. No. 4,595,175, which utilizes a fence liner intended to prevent weeds grass and other vegetation from growing near the bottom portion of the fence. Both the Rooney and Kauffman references seek to address the problems addressed in this application, however they are materially different from the current application.

Another prior art reference can be found at Abbe U.S. Pat. No. 3,515,373 which discloses a fence trim guard, and this also allows for posts to be placed to the trim and into the ground.

A final representative example in the prior art can be found at Hoke U.S. Pat. No. 5,328,156, which is a device that attaches to the bottom of a chain-link fence with friction. In the present invention there are spike holes, and the application of the device is secure to the ground in that manner as well as a plurality of ribs on the underside of the device to prevent movement of the base pieces. Furthermore, the present invention teaches an upright portion that attaches directly to the fence.

BRIEF SUMMARY OF THE INVENTION

In order to prevent weeds from growing around fence material or to prevent small animals for burrowing under the fence, this device will have two essential components: a first base member and a second base member. Each of the base members are placed adjacent to the fence and have a flat surface as well as a vertical surface. Embedded members are also included in the horizontal members; for purposes of this application it is contemplated that the embedded members will include lights as an example of an embedded member.

There are several different embodiments to securing the base members to achieve the stated goal of preventing weed growth and animal escape. Additionally, there are specific parts that are designed to cover the fence posts to achieve the stated goals as well.

Each of the base members extend a predetermined distance away from the fence as well as a predetermined distance above the ground surface. This extension away from the fence should be sufficient so that the homeowner can use a lawnmower over the device without striking the fence. The two base members may be secured to one another or secured to the fence itself with clips that are provided on the respective vertical members.

On the flat surface a plurality of holes is provided for spikes or stakes to aid in securing the base members to the ground. The device may also have ribs on the bottom of the base members to prevent the device from shifting and to provide drainage areas. A variety of different means to secure the base members to the ground may alternatively or additionally be implemented.

As the two base members are aligned on opposite sides of the fence, the piece for securing the two sections are also aligned. The two members may be secured with a plurality of bolts and nuts or it may be through a plurality of snaps through a plurality of corresponding openings. Additionally, one of the horizontal base members may be comprised of a slightly longer member that will be inserted into a corresponding insert on the other base member.

On the bottom surface of each base piece will be a plurality of ribs which are slightly raised from the surface. This prevents the individual sections from moving as well as provide additional stability and additional space for water drainage through the device. In order to secure the sections to the ground, a plurality of slits or openings is provided on each of the base members; the securement of the base members may be altered depending on the ground surface e.g. grass, dirt or concrete. In this manner, the homeowner can simply secure this device using a spike or other means to secure the individual base members.

With regard to openings around fence end posts and line posts, there will be separate sections for end posts and a separate section for line posts. Each of the sections for end posts and line posts will have a curved portion surround a portion of either the end post or line post. A mating portion will also be provided around the end post to encapsulate the fence post.

With regard to line posts, which are typically on one side of a fence, a curved portion that extends partially around the line post is provided. The section covering the line post may connect to the fence itself or to another corresponding section on the other side of the fence.

At the end of the fence there will also be separate members that will accommodate when the fence ends. There will be two base members which extend beyond a predetermined distance beyond the end of the fence.

NUMBERING DESCRIPTION

1—Fence
2—Line post
3—End post
5—Device
10—First horizontal Member
10v—First vertical member
12a—First line post base
12b—Second line post base
14a—First end post base
14b—Second end post base
15—Hole
16—Spike Hole
17a—Line post base section
17b—End post base section
17c—Rectangular base section
17d—Circular base section
20—Second Base Member
20v—Vertical member
25—Ribs
28—Attachment means
29—Snap
30—Nut
31—Bolt
32—Hinge and Rod Connection
40—Slot
41—Tab
60—Single base member
61—Vertical Member
62—Strip
70—Expander
75—Embedded member

DETAILED DESCRIPTION OF THE EMBODIMENTS

This device 5 is intended to surround the bottom area of a fence 1 so that yard maintenance can be reduced. The fence itself is not being claimed but is integral to the device.

Figure 1:
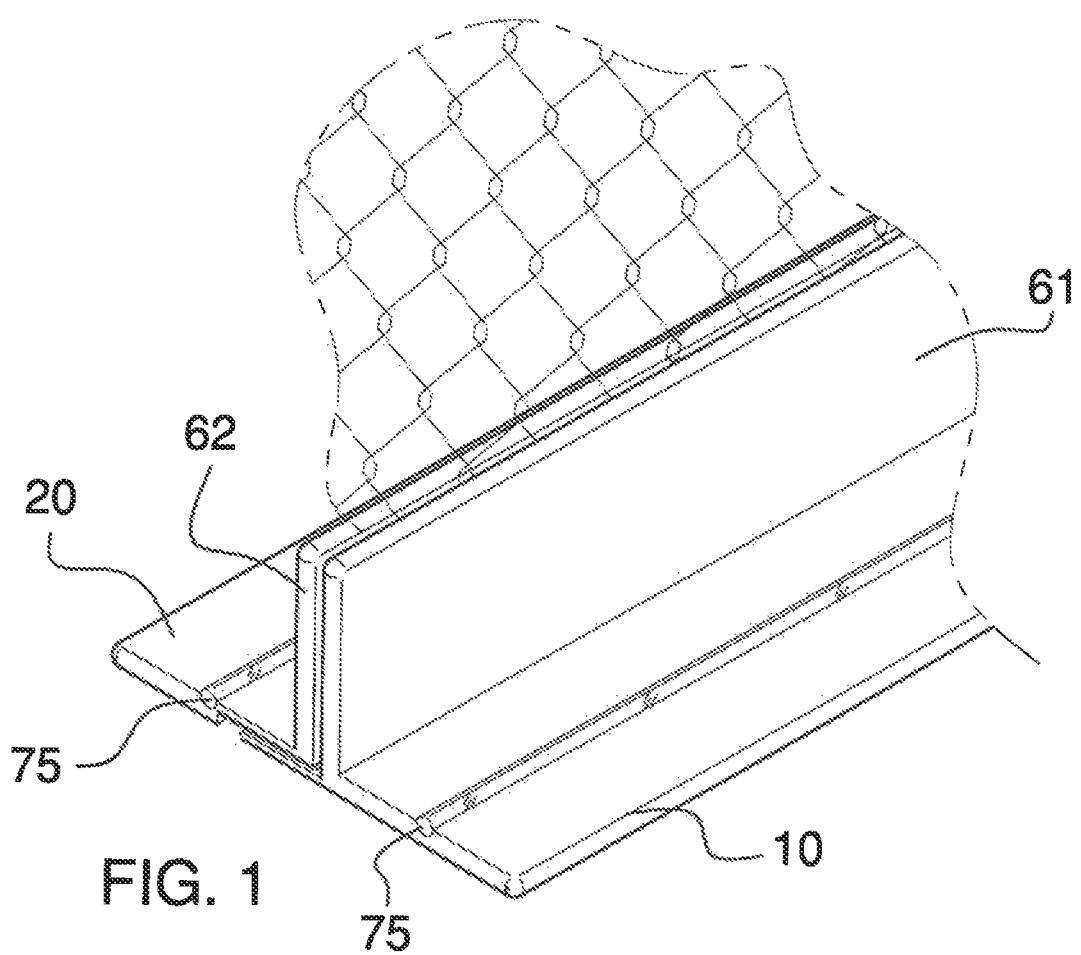
FIG. 1 is an isometric view of the base members and the fence depicting the embedded member in the horizontal member.
Figure 2:
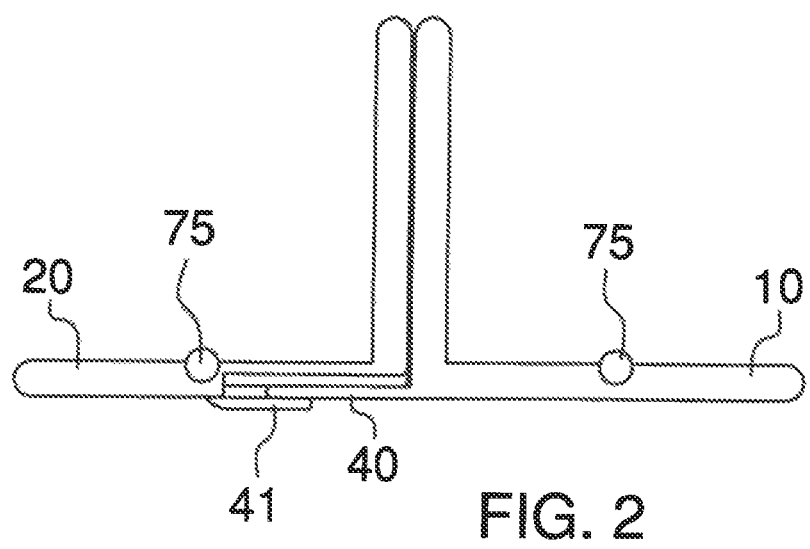
FIG. 2 is a side view of the base members with the embedded members without the fence showing the approximate alignment of the sections when the device is installed.
Figure 3:
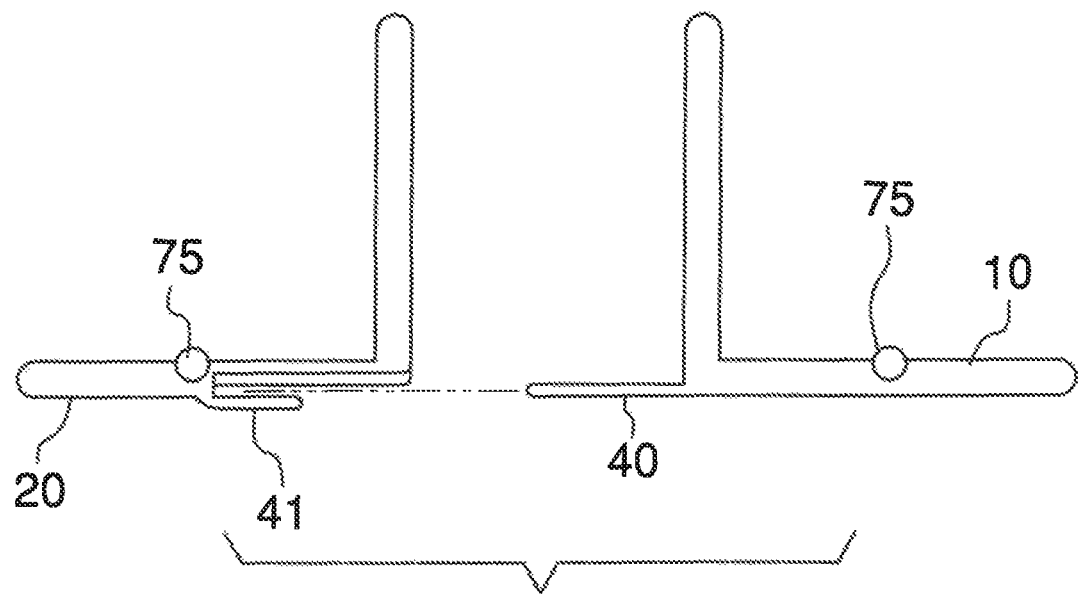
FIG. 3 is an exploded view of the base members showing the approximate alignment of each base member with the embedded member.
Figure 4:
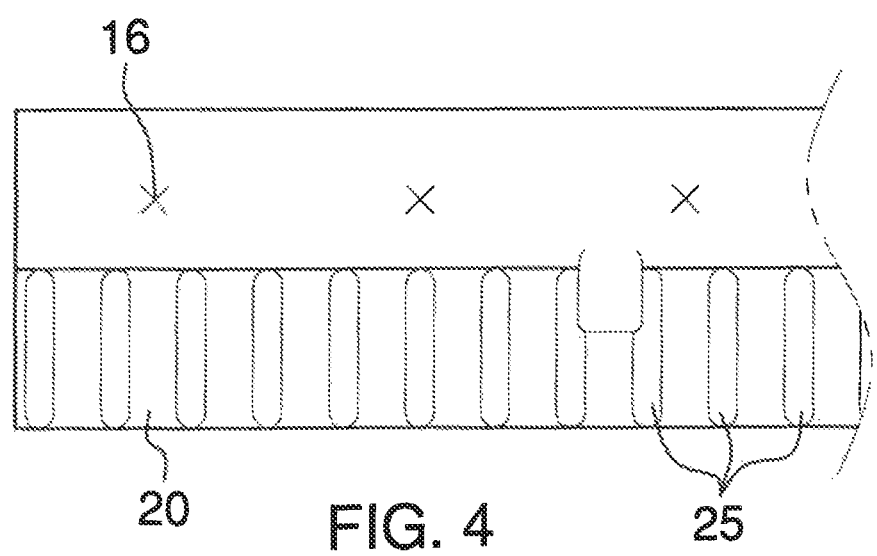
FIG. 4 is a bottom view of the second base member showing a plurality of ribs that have been placed on the underside of the base member and a plurality of cross-slits.

A pair of two base or horizontal members, a first base 10 and a second base 20 are provided and will attach on opposite sides of the fence 1. Each of the base members, 10 and 20 will be comprised of a flat horizontal section and an integral vertical member 10v and 20v respectively. Each of the base or horizontal members 10 will be provided with a cavity such as depicted into which an embedded member 75 as depicted in FIGS. 1, 2 and 3 is inserted. The cavity extends the length of the horizontal member. An embedded member 75 may be a strip of lights to provide illumination; the embedded lights may be powered by household current, battery power or solar power. Alternatively, the embedded member 75 may be a strand of wire in the horizontal members to provide a slight shock to discourage animals from digging under the fence or provide a slight shock to discourage a family pet from digging under the fence to leave the yard.

When the device is surrounding the bottom of the fence such as depicted in FIG. 1, the horizontal sections of the base members will cover the ground surface and each of the horizontal sections will extend outward from the fence a predetermined distance. The distance that the horizontal portion will extend away from the fence should be long enough to enable the homeowner to maintain his or her lawn without impacting the fence and prevent animals from burrowing under the fence. Because the horizontal sections cover the ground surface, grass and other weeds cannot grow under each of the horizontal sections. Additionally, each of the vertical sections, 10v and 20v, will extend upward from the ground surface along the bottom of the fence a predetermined distance. The exact length of each of the vertical sections is determined to insure that the base members are secured to each other along the fence line without detracting from the cosmetic appeal of the device. The height of the vertical members should also be high enough to prevent the growth of weeds between the vertical sections.

The vertical sections may connect to each other with a bolt 31 and nut 30 connection. Additionally, as an alternative to the bolt 31 and nut 30 there may be a prod, which will attach to a corresponding snap. It is anticipated that other connection mechanisms may alternatively or additionally be utilized by one of ordinary skill in the art to attach the two base members together.

On the outside of each of the base members will be a series of spike holes 15, which are also depicted in FIG. 1. The spike holes 15 are oriented in a cross to permit the homeowner to secure this device into the ground surface with a spike. Unlike if a hole was provided, the cross orientation of the spike holes also prevent grass or weeds from growing through the device 5 when a spike is not inserted.

First Embodiment

In the first embodiment, the bottom of base member 20 will be a plurality of raised ribs 25, which will give added stability and integrity of the device. The plurality of ribs 25 will also allow for draining after the device 5 is installed. When the device is installed, the ribs 25 will not be visible, but will also prevent the sections from moving as the sections are impacted by any lawn maintenance equipment. Base member 20 also provides a tab 41 that is placed periodically along the base member's bottom below the plurality of ribs 25.

Figure 5:
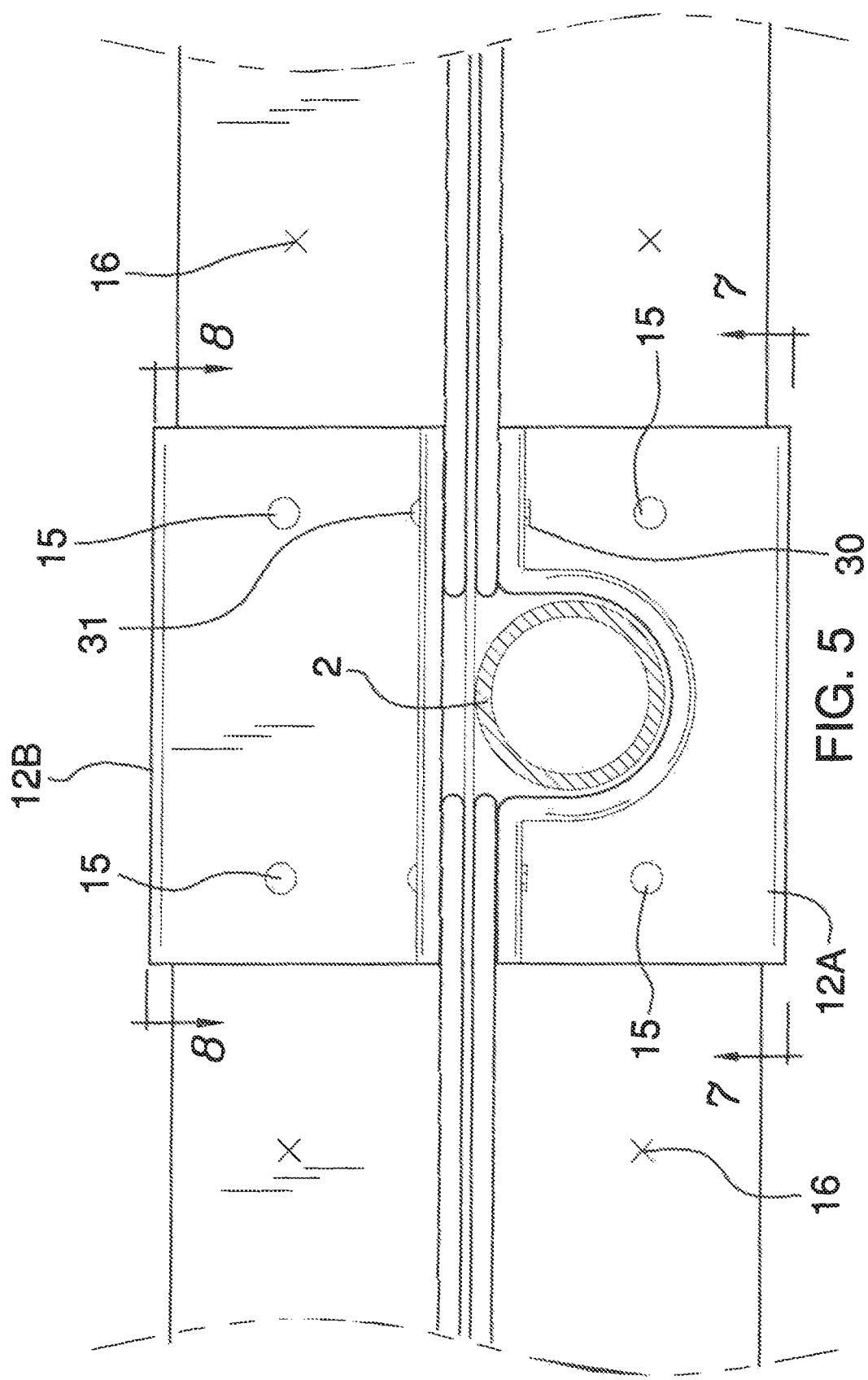
FIG. 5 is a top view of the base members and top line post sections that are surrounding a fence line post.

Because fencing will include a plurality of fence posts there must be special pieces to surround the individual fence post such as depicted in FIG. 5. In FIG. 5, the post base is provided with a curved member which will correspond to the curve in a line fence post. This is important because line posts are secured to one side of a fence.

The base member 10 will have a slot 40 that will extend a predetermined distance from the horizontal portion 10 that will extend away from the fence such as depicted in FIG. 3. On the corresponding base member 20, a lip that will envelope a portion of the slot 40 is provided. When the two base members are connected the slot 40 will be inserted between the plurality of ribs 25 and tab 41. This will allow for water to drain along the slot 40 through the gaps between the plurality of ribs 25 and provide additional stability and strength to the device.

Second Embodiment

Figure 13:
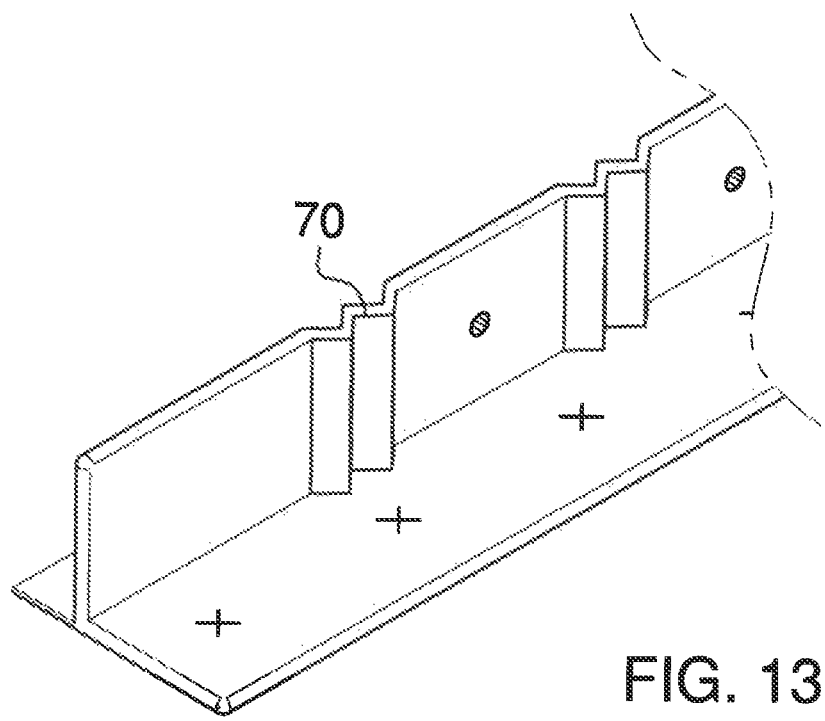
FIG. 13 is a fragmented isometric view of the front side of a base member of a first alternative embodiment, which allows the base member to lie flat over curved ground.
Figure 14:
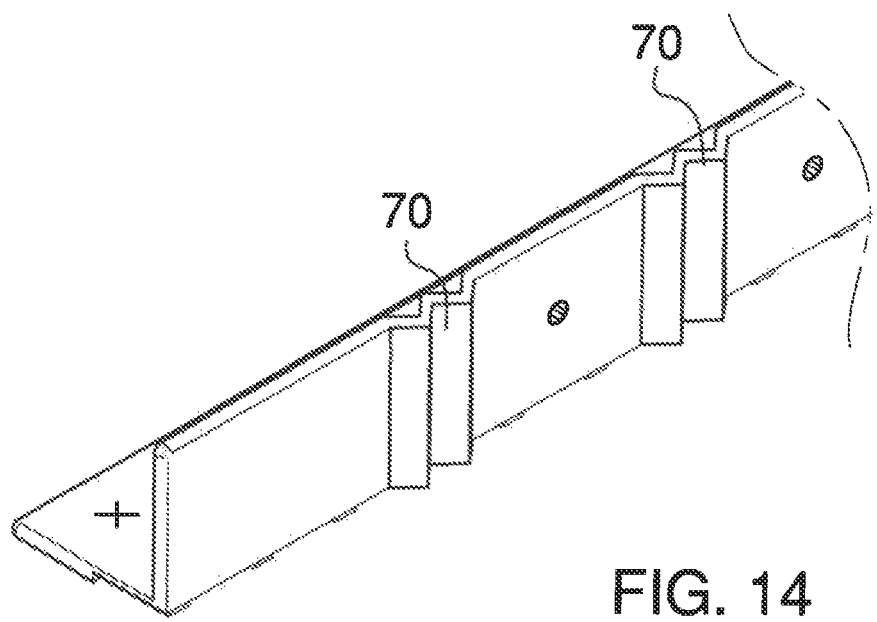
FIG. 14 is a fragmented isometric view of the back side of the base member of a first alternative embodiment, which allows the base member to lie flat over curved ground.

In the second embodiment, an expander 70 is added to the vertical sections of each base member, which can be seen in FIG. 13 and FIG. 14. The expanders 70 will permit the vertical members to bow to accommodate the topography where the ground is uneven.

Third Embodiment

Figure 15:
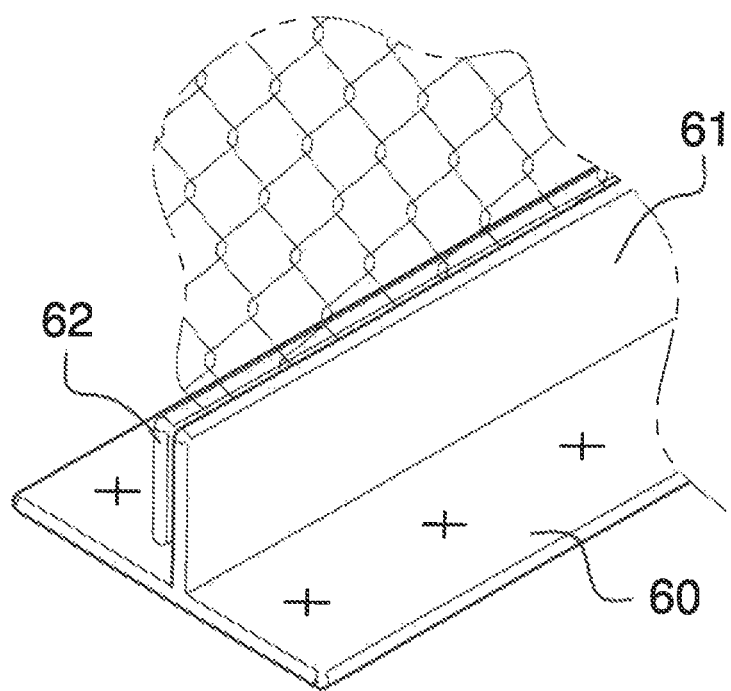
FIG. 15 is an isometric view of a second alternative embodiment.
Figure 16:
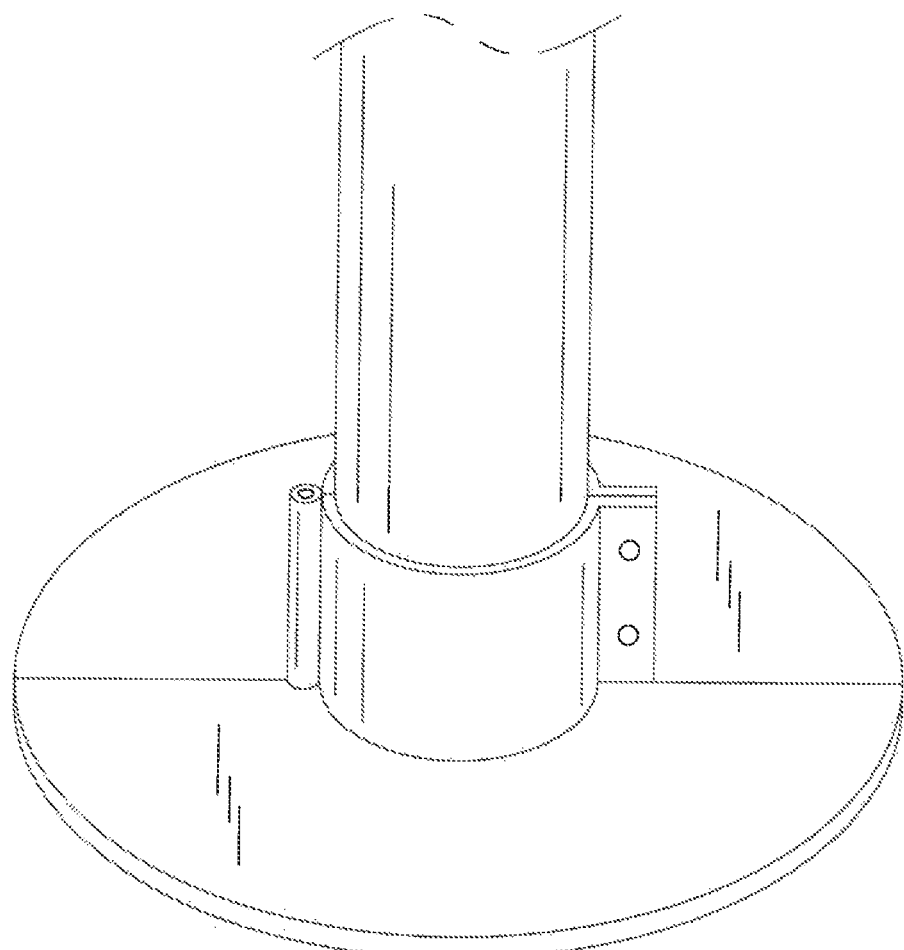
FIG. 16 is a front view of an alternative circular base section for a fence post with a clamp sitting atop the circular base section and surrounding the post of the fence.

In a third embodiment, the slot and tab are not used such as depicted in FIG. 15. Instead, there is a single member 60 that is comprised of horizontal section of predetermined dimensions and a vertical member of predetermined height. A separate vertical section 62 is placed along one side of the fence and is secured to the vertical member 61 of the corresponding single member 60. The strip section 62 is connected to the vertical member 61 with a nut and bolt assembly similarly to the other embodiments covered within this disclosure.

The third embodiment will prevent water from pooling as a gap is created between the end of the vertical member 61 and the top section of the single member 60.

Fourth Embodiment

In the fourth embodiment, an expander 70 is added to the vertical section 61 and horizontal strip 62 (not depicted). The expanders 70 will permit the vertical members to bow to accommodate the topography where the ground is uneven.

Figure 6:
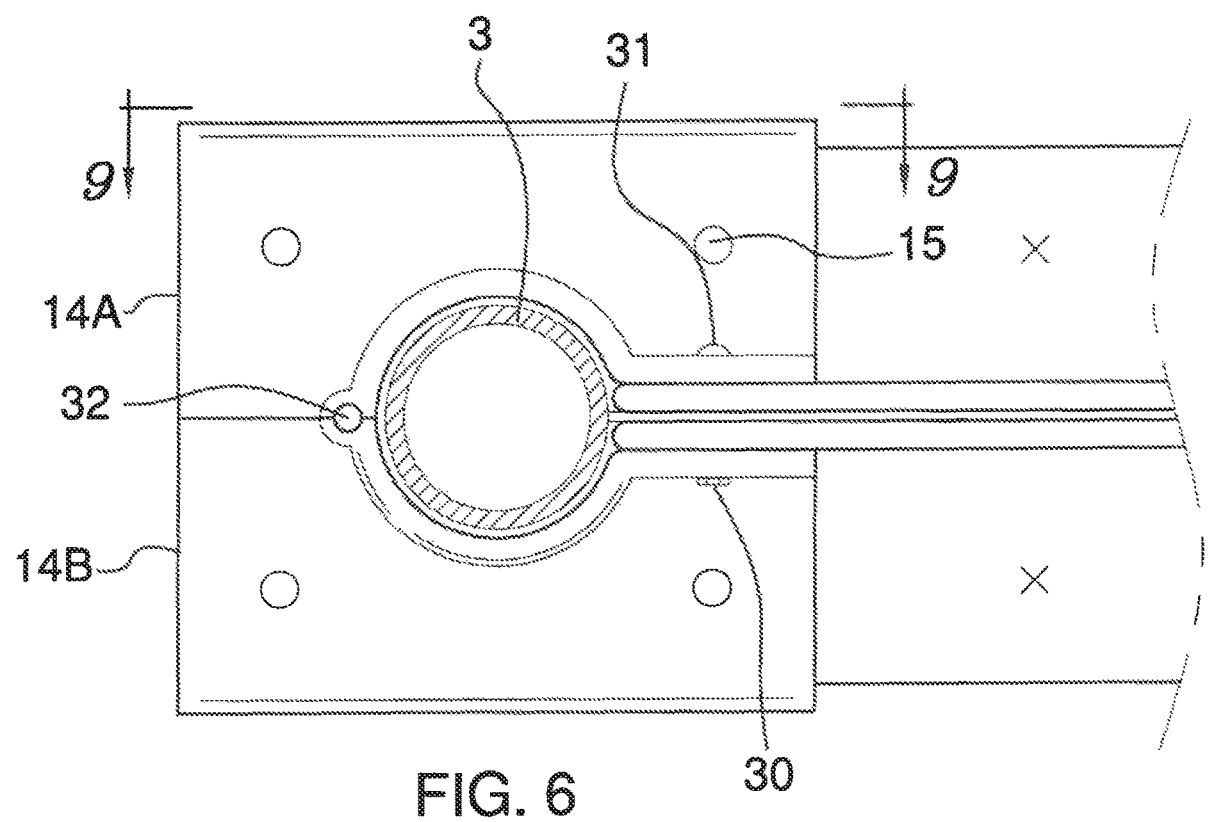
FIG. 6 is a top view of the base members and top end post sections that are surrounding an end post of a fence.

Each of the four embodiments will require additional attachments that provide material to cover areas next to or around line posts and end posts. Typically, the end post 3 is positioned so that the chain link fence runs to the middle of the post. A first end post base 14a and a second end post base 14b are provided specifically for end posts 3, which is also shown in FIG. 6. Pieces 14a and 14b mate together around the post with a hinge and rod connection 32 and at least one bolt and nut connection to prevent grass from growing up the respective end post. The first and second end post bases, 14a and 14b respectively, will determine the end of the fencing. The 14a and 14b bases also secure the ends of any of the disclosed base members, which can be seen in FIG. 6.

Figure 7:
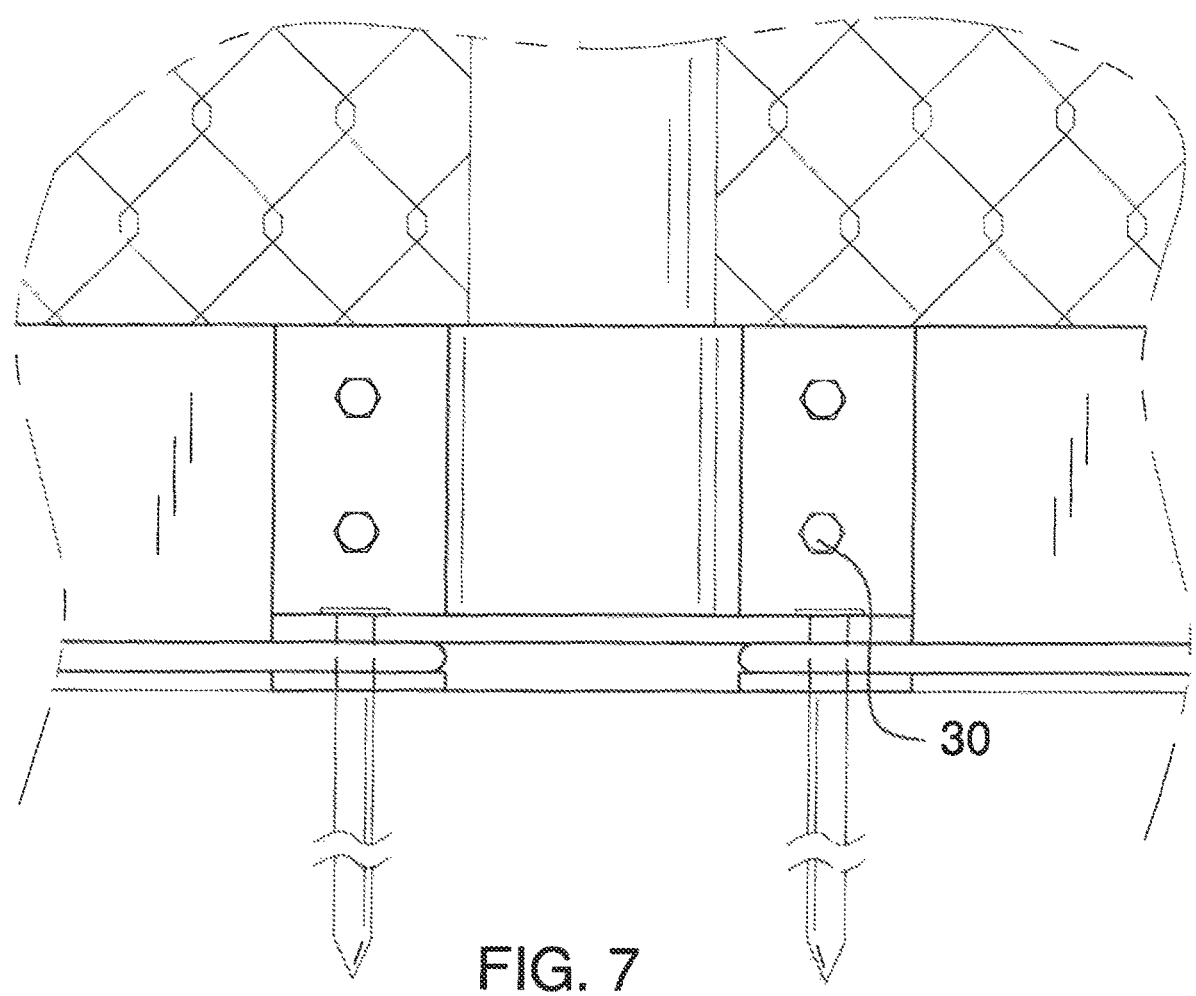
FIG. 7 is a front view of two base member sections, a first top line post section and a bottom line post section secured to each other and around the line post.
Figure 8:
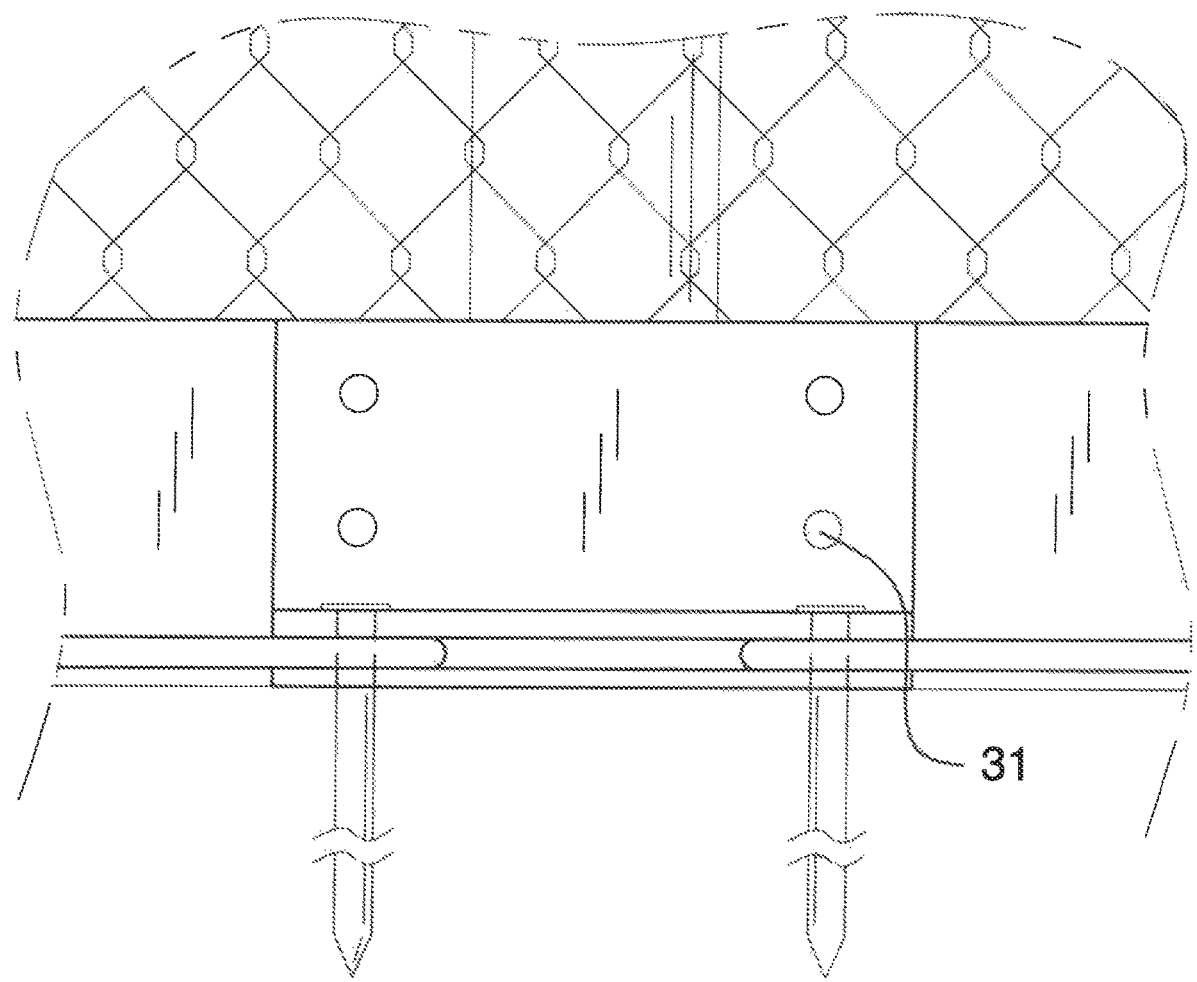
FIG. 8 is a back view of two base member sections, a second top line post section and the bottom line post section secured to each other around the line post.
Figure 9:
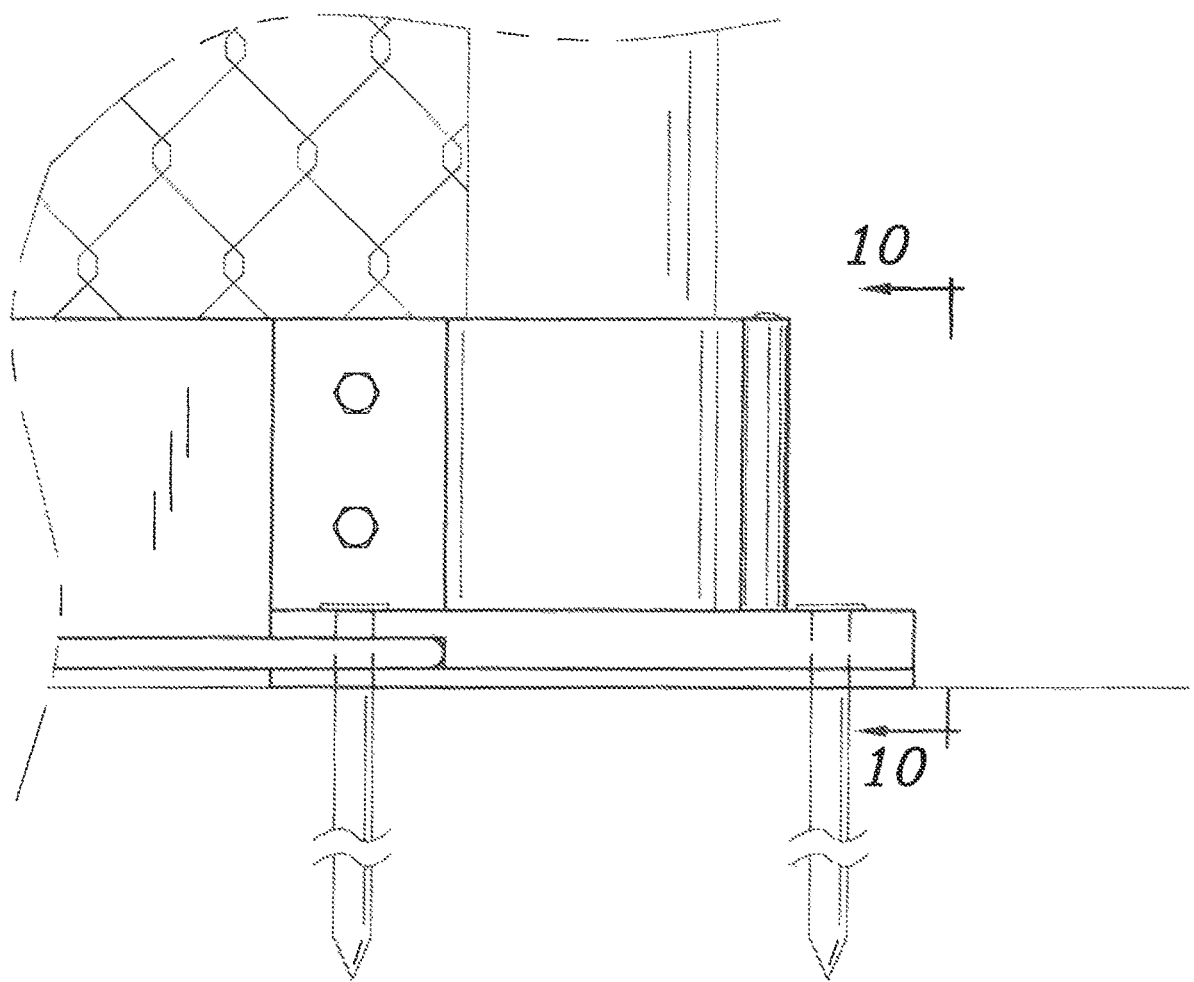
FIG. 9 is a front view of the means to secure the device to an end post at the end of a fence.
Figure 10:
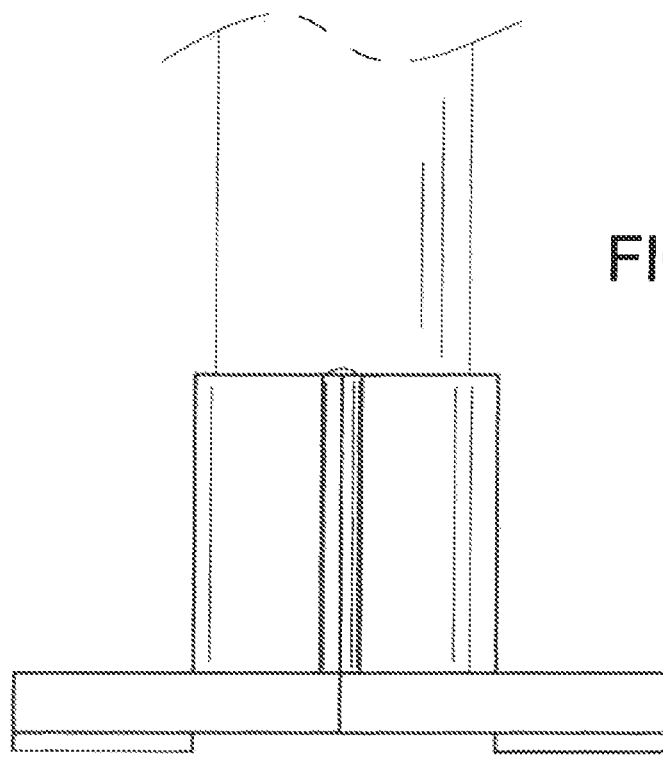
FIG. 10 is a side view of the base members attached to an end post.

With regards to line posts, they are typically on only one side of the fence, which can be seen in FIGS. 5, 7 and 8. A first line post base 12A and a second line post base 12B are provided specifically for line posts 2. Both line post bases, 12A and 12B, have a plurality of holes 15, and an integrated vertical section. The vertical section provided on base 12A spans partially around the line post 2 and overlaps on both sides with an adjacent base member 10 or 20. The vertical section provided on base 12B is flat and runs parallel to the fence. The plurality of holes 15 allows spikes to be easily inserted and placed into the ground for securement of the line post bases.

The second line post base 12B is provided on the opposing side of the line post 2 of first line post base 12A. The two line post bases connect together with bolt and nut assemblies with can be seen in FIGS. 5, 7 and 8. The ends of the base members for any of the embodiments are to be secured between portions of the two line post bases, which can be seen in FIG. 5.

Figure 12A:
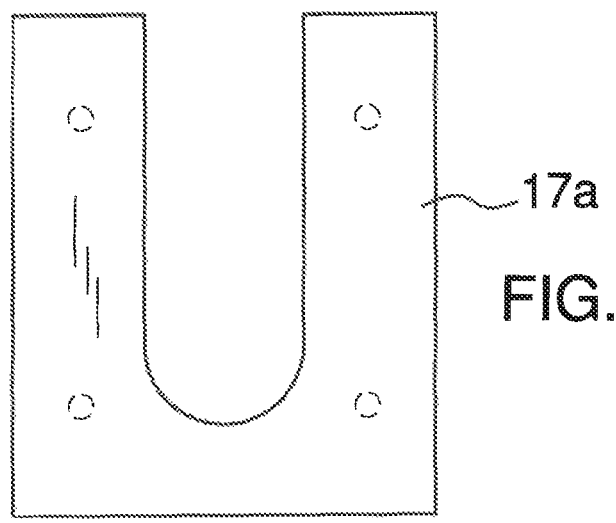
FIG. 12A is a top view of a line post base member.
Figure 12B:
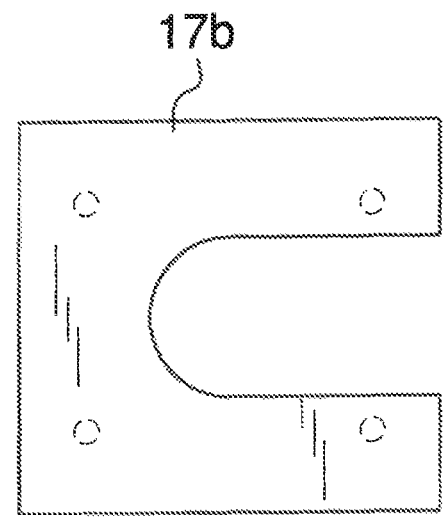
FIG. 12B is a top view of an end post base member.
Figure 12C:
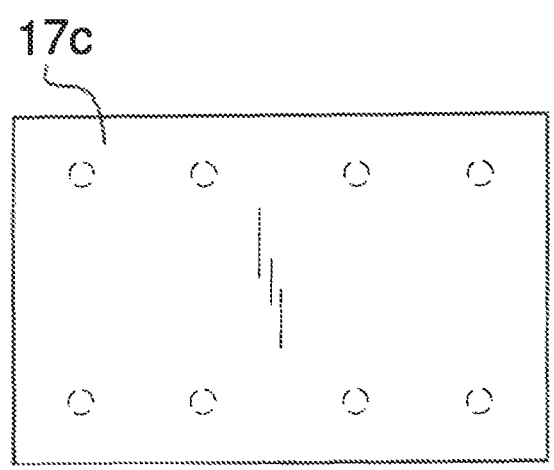
FIG. 12C is a top view of a rectangular base member.

FIG. 12 shows ground cover sections. These sections are intended to offer additional ground coverage to further prevent grass or weed growth near fence line. These sections are to be placed under any of the base members described herein and can be seen in FIG. 7, FIG. 8, FIG. 9, FIG. 10, FIG. 12, and FIG. 16.

Figure 11:
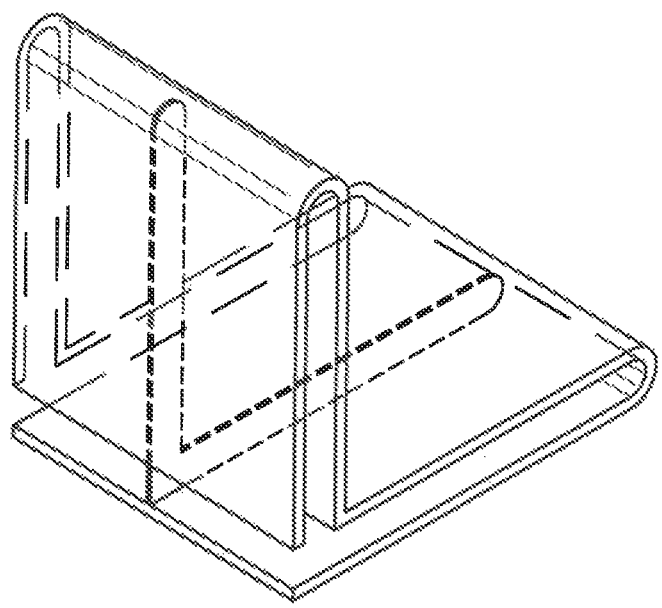
FIG. 11 is an isometric view of a portion of a coupling to adjoin an end of one base member to an end of another base member.

A base member coupling is also provided to adjoin one base member to another in the event the distance between fence posts is longer than the length of a base member. The base member coupling is shown in FIG. 11.

Because the fencing material will be outside, the material that will be used for this device should be resistant in all environmental conditions and should not decay or rust.

The invention claimed is:

1. A fence trim guard which is comprised of:
   a. a first base member;
      wherein the first base member has a horizontal surface and a vertical surface;
      wherein a cavity is provided on the horizontal surface of the first base member;
      said cavity extends the length of the first base member;
      wherein the vertical surface of the first base extends a predetermined distance above the horizontal surface of the first base;
   b. a second base member;
      wherein the second base member has a horizontal surface and a vertical surface;
      wherein a cavity is provided on the horizontal surface of the second base member;
      said cavity extends the length of the second base member;
      wherein the vertical surface of the second base member extends a predetermined distance above the horizontal surface of the second base member;
   c. an extension;
      wherein the extension is provided on the first base member;
   d. a slot;
      wherein a tab is provided on a bottom of the second base member;
      wherein the slot fits within the tab;
   e. a plurality of spike holes;
      wherein the plurality of spike holes is provided on the horizontal surface of the first base member;
      wherein a plurality of spike holes is provided on the horizontal surface of the second base member;
   f. a plurality of ribs;
      wherein the plurality of ribs are placed on the underside of the horizontal surface of the first and second base members; and
   g. a strip of lights;
      wherein the strip of lights is placed in the cavity of the first base member;
      wherein the strip of lights is placed in the cavity of the second base member;
      wherein the strip of lights can be removed from the cavity of the respective base members.

2. A fence trim guard as described in claim 1 wherein the first base member is connected to a subsequent first base member with a base member coupling.

3. A fence trim guard as described in claim 1 wherein the embedded material in the horizontal member is a plurality of lights.

4. A fence trim guard as described in claim 1 wherein the embedded material in the horizontal member is a charged electrical circuit.

5. A fence trim guard as described in claim 1 wherein the second base member is connected to a subsequent second base member with a base member coupling.

6. A fence trim guard as described in claim 1 wherein the vertical surface of the first base member has at least one expander.

7. A fence trim guard as described in claim 1 wherein the vertical surface of the second base member has at least one expander.

* * * * *